United States Patent [19]

Lake, Jr. et al.

[11] Patent Number: 4,624,434
[45] Date of Patent: Nov. 25, 1986

[54] STABLE TILTABLE DISPLAY TERMINAL

[75] Inventors: Ralph J. Lake, Jr., Somerville; George A. Sudol, Mine Hill, both of N.J.

[73] Assignee: Burroughs Corporation, Detroit, Mich.

[21] Appl. No.: 683,578

[22] Filed: Dec. 19, 1984

[51] Int. Cl.⁴ ............................................. A47G 1/24
[52] U.S. Cl. .................................. 248/454; 248/292.1; 248/372.1; 403/146; 403/229
[58] Field of Search ............ 248/454, 625, 565, 372.1, 248/280.1, 292.1, 297.1, 597, 598, 579, 1 C, 1 H, 1 I; 403/146, 148, 111, 229

[56] References Cited

U.S. PATENT DOCUMENTS

| | | | |
|---|---|---|---|
| 2,954,957 | 10/1960 | Johnson et al. | 248/597 X |
| 3,593,952 | 7/1971 | Smith | 403/146 X |
| 3,845,928 | 11/1974 | Barrett et al. | 403/111 X |
| 4,310,136 | 1/1982 | Mooney | 248/183 X |
| 4,395,010 | 7/1983 | Helgeland et al. | 248/183 X |
| 4,437,638 | 3/1984 | Scheibenpflug | 248/282 |

Primary Examiner—Ramon S. Britts
Assistant Examiner—Karen J. Chotkowski
Attorney, Agent, or Firm—Mark T. Starr; Kevin R. Peterson

[57] ABSTRACT

A tilt control apparatus comprises a tiltable display assembly pivotally coupled to a base support member through a hinge structure including a torsion spring and friction producing means which operate to permit the display assembly to be tilted to and held securely at any desired angle.

11 Claims, 5 Drawing Figures

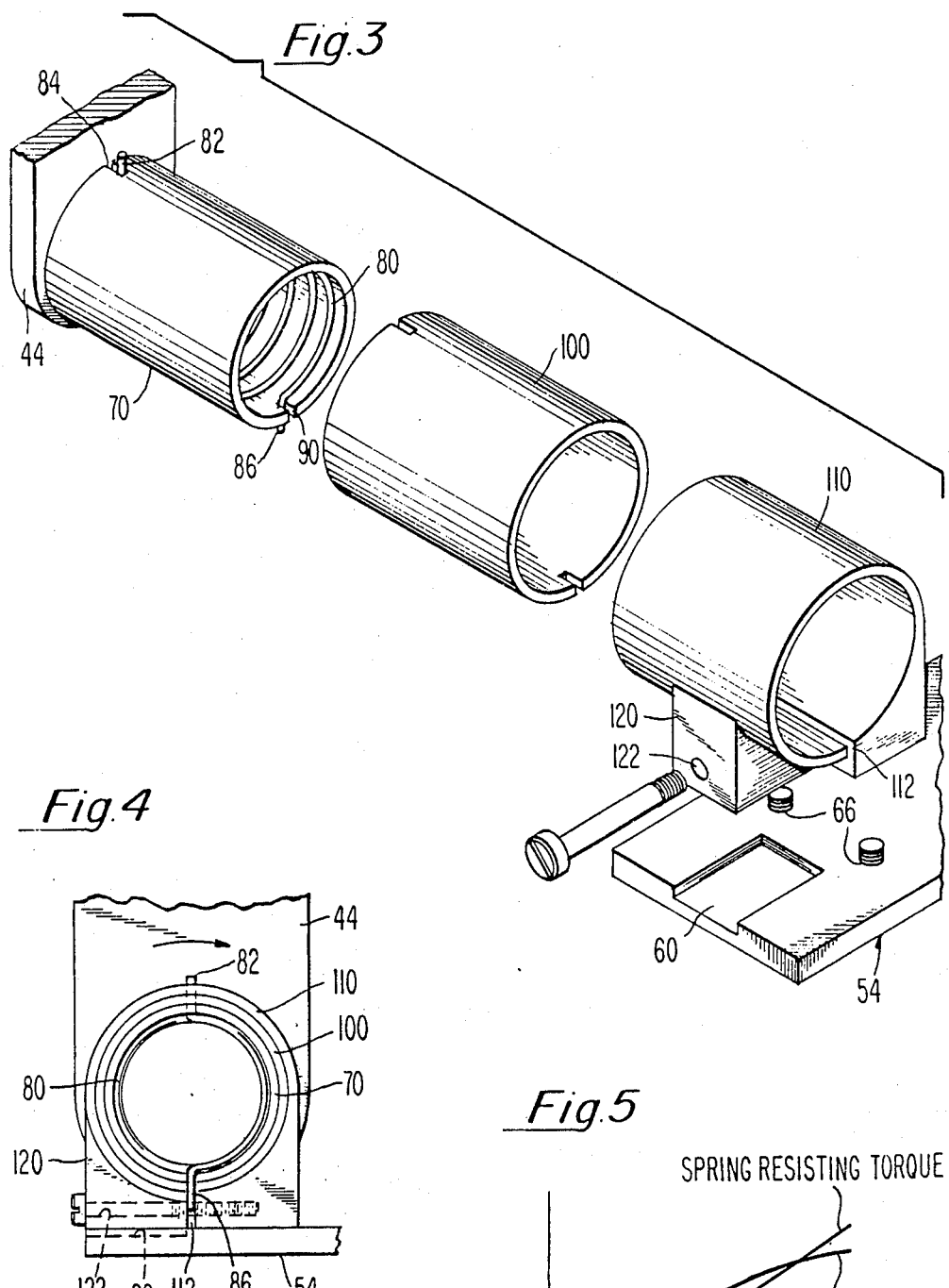

STABLE TILTABLE DISPLAY TERMINAL

CROSS-REFERENCE TO RELATED APPLICATIONS

Reference is made to a copending application entitled "Data Display Terminal Using a Flat Display Panel", Ser. No. 683,579, filed concurrently with the present application by Ralph J. Lake, Jr., et al. and assigned to the same assignee as the present application.

Reference is also made to a copending application entitled "Display Terminal", Ser. No. 683,683, filed concurrently with the present application by Timothy R. Stern, et al., and assigned to the same assignee as the present application.

BACKGROUND OF THE INVENTION

Up to recent times, data display terminals have utilized cathode ray tube monitors to display information, and these monitors have been specially constructed to tilt and swivel for operator comfort.

In a concurrently filed application, a terminal is described which utilizes a flat panel display in a compact housing which pivots with respect to a base support which rests on a table. This flat panel terminal presents special problems in that it is necessary to be able to pivot the display portion with respect to the base and have the display portion maintain any desired angle of repose with respect to the base.

The prior art provides some teaching which can be used for controlling pivoting or rotation of two parts with respect to each other; however, the present invention combines torsion springs and friction sleeves to provide a simple yet effective tilt control.

DESCRIPTION OF THE DRAWINGS

FIG. 3 is a perspective exploded view of the hinge area of the terminal of FIG. 1;

FIG. 4 is a front elevational view of the hinge structure shown in FIG. 3; and

FIG. 5 shows curves which illustrate the relationship between the torque tending to rotate the display assembly of the terminal and the counter torque produced by the invention.

DESCRIPTION OF THE INVENTION

Figure 1:
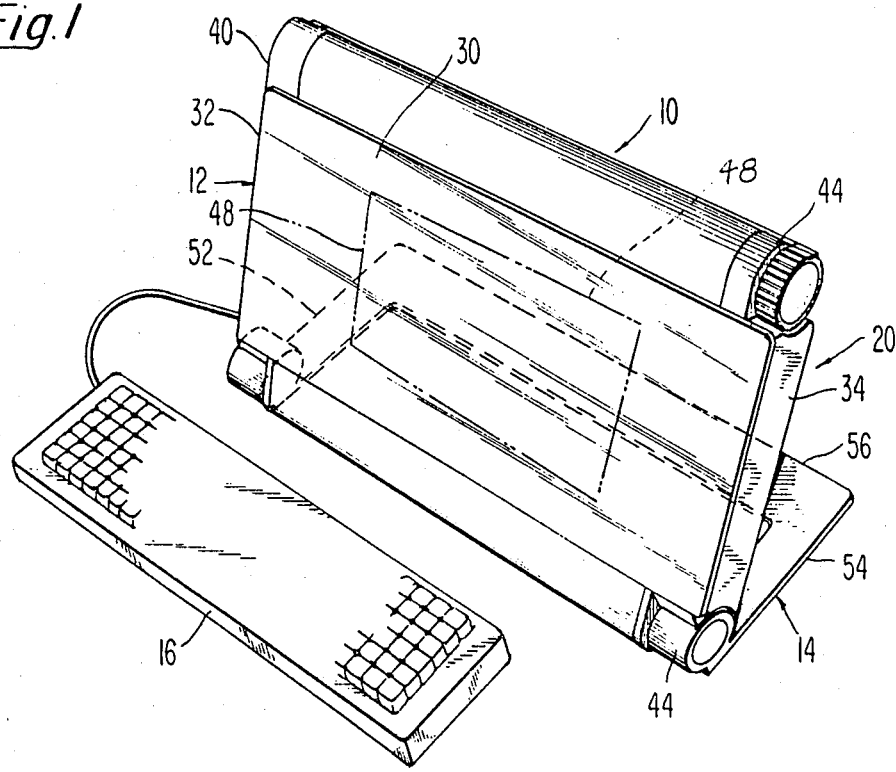
FIG. 1 is a perspective view of a data display terminal embodying the invention.
Figure 2:
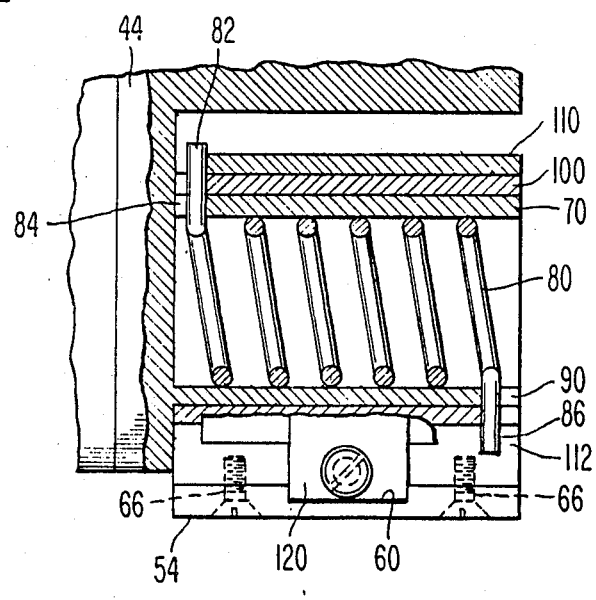
FIG. 2 is a sectional view through a hinge area in the terminal of FIG. 1.

A flat panel display terminal 10 which utilizes the present invention is described in a concurrently filed application of Ralph J. Lake, Jr, et al, entitled Data Display Terminal Using a Flat Display Panel. All of the intimate structural details of the terminal are described in that application, and only sufficient detail shown and described here to illustrate the principles of the present invention. Briefly, terminal 10 includes a display panel assembly 12 pivotably coupled to a base 14 which rests on a table or the like. A keyboard 16 is coupled to the display assembly, and connections may also be provided to a computer or the like.

The display panel assembly 12 includes a housing 20 for the display panel, and this assembly comprises a central panel-housing portion 30 having a left end 32 and a right end 34, and left and right end caps 40 and 44 which are secured to the ends of portion 30 in any suitable manner. These parts may be of extruded aluminum.

A display panel 48 is suitably secured to portion 30 of housing 20. The base 14 is U-shaped and includes legs 52 and 54 connected by arm 56.

At the free end of each arm 52 and 54 and in the top surface is formed a slot 60, and at least one threaded hole 66 is provided in each slot. Each end cap 40, 44 includes at its lower end similar features (which carry the same reference numerals) for connecting it and the entire display assembly to the base 14 and forming a hinge structure.

These features include a horizontally projecting hollow, open-ended tube 70 in which a helical spring 80 is seated. The springs are oriented to perform in the manner described below. One end 82 of the spring projects through a slot 84 in the end wall of the tube 70, and the other end 86 of the spring projects through a slot 90 in tube 70. A friction-producing bushing or sleeve 100 of nylon or the like is threaded on the tube 70 and includes tube 70. Sleeve 100 is suitably slotted to receive the ends of the spring. A split bracket 110, having a longitudinal space 112 between its adjacent ends, and having a tab 120 on its outer surface, is slipped over the tube and sleeve in an adjustable mechanical fit. The frictional fit of the bracket 110 with sleeve 100 can be adjusted by opening or closing the space 112 in the bracket by means of a screw which is inserted in the threaded hole 122 in tab 120 and engaging a hole in the other portion of the bracket and is used to pull the two parts of the bracket together and narrow space 112. Thus, the frictional engagement of bracket 110 and sleeve 100 can be adjusted. The end 86 of spring 80 is positioned in space 112 of each bracket.

The brackets 110 are seated at the ends of the legs of the U-shaped base with one on leg 52 and one on leg 54, and the tab 120 of each bracket is seated in the notch 60. Each bracket resting on the leg is secured thereto by means of screws inserted in the holes 66 and into holes in the tabs 120 or other portions of the brackets.

In operation of the apparatus of the invention, assume that, initially, the display panel assembly 12 is vertical and the springs 80 are in the unstressed state with ends 86 and 82 disposed vertically, as illustrated schematically in FIG. 4. As the display assembly is pivoted clockwise, sleeves 100 and tubes 70 rotate inside brackets 110, and the tubes bear against ends 82 of springs 80, and end 82 in FIG. 4 moves clockwise. The other one would move counterclockwise. This causes the springs 80 to tighten and exert a counter torque to keep the assembly 12 from continuing to fall. As the parts move with respect to each other, the friction sleeves 100 serve to damp out any tendency for bounce as the display assembly is tilted. The panel assembly 12 can be pivoted to and held at any desired angle with respect to the base 14, and it is held at the desired angle by means of the springs 80 and the frictional effect of sleeves 100.

The theory of operation is that, as the display is moved from the vertical position, the weight of the display becomes unbalanced and causes a downward torque to be applied on the hinge area. In order to have infinite adjustment, there must be an equal and opposite torque to offset the torque applied by the weight of the terminal. The equation for the torque applied by the terminal weight is:

$\tau = WR \cos(90\theta)$

W is the terminal weight,

R is the distance from the center of the terminal to the hinge, $\theta$ is the angle that the unit is moved.

The torsion springs 80 used to counteract the torque produced by the weight of the display are selected to closely approximate the cosine function of the torque as illustrated in FIG. 6.

The above-mentioned concurrently filed application is incorporated herein by reference.

What is claimed is:

1. Tilt control apparatus comprising:
   a base;
   a tiltable member; and
   means for coupling together said tiltable member and said base, said coupling means including a hollow tubular member connected to said tiltable member, a torsion spring disposed within said hollow tubular member, a frictional sleeve enclosing said hollow tubular member, and a split tubular bracket enclosing said sleeve and said hollow tubular member, said split tubular bracket being connected to said base.

2. The apparatus according to claim 1 further including means for adjusting the frictional fit between said split tubular bracket and said sleeve.

3. The apparatus in accordance with claim 2 wherein a first end of said torsion spring is engaged with said hollow tubular member and a second end of said torsion spring is engaged with said split tubular bracket.

4. The apparatus in accordance with claim 3 wherein the first and second ends of said torsion spring are further engaged with corresponding first and second ends of said frictional sleeve.

5. The apparatus in accordance with claim 2 wherein said frictional fit adjusting means includes:
   a tab connected to said split tubular bracket;
   a screw passing through a hole in said tab and engaging a threaded hole in said split tubular bracket, said tab connected to said split tubular bracket at a position whereby the adjustment of said screw opens and closes a longitudinal space between the ends of said split tubular bracket.

6. The apparatus in accordance with claim 2 wherein said sleeve is fabricated from nylon.

7. The apparatus in accordance with claim 1 wherein said coupling means is connected between said base and said tiltable member proximate respective first ends of said base and said tiltable member and wherein said apparatus further includes a second coupling means for further coupling together said tiltable member and said base, said second coupling means being connected between said base and said tiltable member proximate respective second ends of said base and said tiltable member.

8. The apparatus in accordance with claim 7 wherein said tiltable member includes a frame carrying a display panel, said frame having left and right parallel edges, said hollow tubular member projecting laterally from the lower end of said left edge.

9. The apparatus in accordance with claim 1 wherein said tiltable member includes a frame carrying a display panel.

10. The apparatus in accordance with claim 1 wherein said hollow tubular member projects laterally from said tiltable member.

11. Tilt control apparatus comprising:
    a U-shaped base member having two legs,
    a tiltable member coupled to said base member,
    said tiltable member including a frame carrying a display panel,
    said frame having left and right parallel edges, the lower ends of said edges having laterally projecting hollow tubular members,
    a torsion spring disposed within each of said tubular members,
    a frictional sleeve enclosing each tubular member, and
    a split, tubular bracket enclosing each sleeve and its tubular member, the closure of each split bracket being adjusted to set the desired frictional engagement between each split bracket and the associated frictional sleeve,
    each tubular bracket being secured to one leg of said base member,
    one end of each spring engaging its tubular member and the opposite end engaging the associated tubular bracket so that, as said tiltable member is pivoted with respect to said base member by rotation of each tubular member within its tubular bracket, each spring winds up and generates a torque which opposes the pivoting of said tiltable member and permits the tiltable member to hold any desired angular position with respect to said base member.

* * * * *